United States Patent

Fritkin

[15] 3,670,250

[45] June 13, 1972

[54] FM SYSTEM FOR RECEIVING BINARY INFORMATION

[72] Inventor: George A. Fritkin, Silver Spring, Md.

[73] Assignee: Tel-Tech Corporation, Rockville, Md.

[22] Filed: May 26, 1970

[21] Appl. No.: 40,526

[52] U.S. Cl. ................................329/104, 178/66, 325/320, 329/126

[51] Int. Cl. ................................H04l 27/14

[58] Field of Search ..........................329/104, 110, 111, 126; 325/30, 320; 178/66, 88

[56] References Cited

UNITED STATES PATENTS

| | | | |
|---|---|---|---|
| 3,230,457 | 1/1966 | Soffel | 329/110 X |
| 3,543,172 | 11/1970 | Seppeler | 329/104 |
| 3,571,712 | 3/1971 | Hellwarth et al. | 329/104 UX |
| 3,564,412 | 2/1971 | Whang et al. | 325/30 |

*Primary Examiner*—Alfred L. Brody
*Attorney*—Finnegan, Henderson & Farabow

[57] ABSTRACT

A system for determining the frequency of an oscillating signal is provided. The system can be used in the demodulating circuitry of an FM system for receiving binary information in the form of an FM signal. The frequency of the received FM signal is determined by transforming the FM signal into a series of pulses having voltage transitions occurring at a frequency determined by the received signal and by measuring the time lapse between successive voltage transitions in the series of pulses. The system is responsive only to frequencies in a predetermined frequency operating range, and produces a binary output signal to indicate the binary information represented by a received FM signal in the frequency operating range of the system.

14 Claims, 4 Drawing Figures

INVENTOR
GEORGE A. FRITKIN

Finnegan, Henderson & Farabow
ATTORNEYS

INVENTOR
GEORGE A. FRITKIN

Finnegan, Henderson & Farabow
ATTORNEYS

INVENTOR
GEORGE A. FRITKIN

Finnegan, Henderson & Farabow
ATTORNEYS

FM SYSTEM FOR RECEIVING BINARY INFORMATION

The present invention relates to a system for determining the frequency of an oscillating signal and, more particularly, to a system which receives binary information in the form of a frequency modulated signal and demodulates the signal to provide a binary output signal indicating the received binary information.

In frequency modulation (FM) systems for transmitting information, a signal of varying frequency is used to transmit the information. The frequency of the transmitted signal is varied to indicate different units of information. In FM transmission systems it is desirable to provide a receiver which accurately identifies the signals of the varying frequency to prevent errors in the determination of the transmitted information.

In the transmission of binary information, an FM system utilizes only two different frequencies to indicate the units of binary information. In this type of system, a first frequency $F_1$ is used to represent a binary "1" and a second frequency $F_2$ is used to represent a binary "0". A data unit or modem is used in the system to perform transmitting and receiving operations.

In transmitting operations, the data unit or modem converts binary information into frequency modulated sinusoidal signals capable of being transmitted by conventional communication equipment, such as radio frequency transmission systems and telephone communication networks. In receiving operations, the modem converts received frequency modulated sinusoidal signals into binary output signals indicating the transmitted binary information.

Data units or modems are particularly useful, for example, in a system for transmitting binary information over a telephone communication line to and from a computer operating on binary signals which constitute the machine language of the computer. In this type of system, a first modem is used to convert the binary "1s" and "0s" of the machine language into sinusoidal signals at frequencies which are compatible with the telephone communication line. The sinusoidal signals are applied to the telephone line for transmission to a second modem which reconverts the sinusoidal signals into binary information. Thus, the system provides a transmitting and receiving arrangement which enables computers to communicate on a telephone line.

In the construction of a modem including transmitting circuitry for converting binary information into frequency modulated signals and receiving circuitry for reconverting frequency modulated signals into binary signals it is desirable to use digital components in the circuitry. The utilization of digital components in the circuitry enables the modem to achieve extremely high accuracy in its converting operations.

An advantage of utilizing digital components is that the accuracy of the operation of the modem can be improved by merely increasing the number of digital components in its circuitry. The accuracy of the modem is also improved because the operating characteristics of the digital components of the modem do not vary with time, temperature, or the application of different electrical potentials to the components. In view of the recent development of inexpensive integrated circuit digital components, another advantage of digital implementation of modems is the ability to construct inexpensive modems by employing digital components.

The present invention concerns the receiving or demodulating circuitry of the modem. This invention provides a system for receiving binary information in the form of frequency modulated sinusoidal signals and producing a binary output signal which accurately indicates the received binary information.

In accordance with the present invention a system for determining the frequency of an oscillating signal is provided. The system of this invention comprises a counting circuit including a plurality of binary counting stages, means for operating the counting circuit at a predetermined frequency to vary the counting states appearing the binary counting stages, and a circuit for transforming the oscillating signal into a series of pulses having voltage transitions occurring at a frequency determined by the frequency of the oscillating signal. In addition, the system includes means operated by a first voltage transition in the series of pulses for setting the binary counting states of the counting circuit to predetermined counting states, and a converting circuit including a plurality of binary elements operated by a second voltage transition in the series of pulses and responsive to the counting states appearing in selected binary counting stages of the counting circuit for combining the counting states to produce an output signal to indicate the frequency of the oscillating signal.

A preferred embodiment of the system includes a converting circuit having a plurality of binary elements connected to a first group of binary counting stages of the counting circuit for reading the counting states appearing in the group of binary counting stages and producing output signals determined by the counting states. The converting circuit includes means for combining the output signals produced by its binary elements to produce a binary output signal to indicate the frequency of the oscillating signal.

In the preferred embodiment, an indicator circuit is provided for producing a binary output signal determined by the frequency of the signal received by the system to indicate the binary information represented by the received signal. The indicator circuit is operated by the output signal of the converting circuit so that its output signal is determined by the counting states appearing in the first group of binary counting stages and read by the binary elements of the converting circuit.

In the operation of the system, a frequency modulated signal received by the system is transformed into a series of pulses having voltage transitions occurring at a frequency determined by the frequency of the received signal. A first voltage transition in the series of pulses is applied to the binary counting stages of the counting circuit to set the binary counting stages to predetermined counting states. The counting circuit is operated at a predetermined frequency which exceeds the frequency of the received signal, and it counts in a predetermined counting sequence starting from the predetermined counting states established at the first voltage transition in the series of pulses. A second voltage transition in the series of pulses operates the converting circuit which reads the counting states appearing in selected binary counting stages of the counting circuit and produces an output signal to indicate the frequency of the received oscillating signal.

The preferred embodiment of the system also includes first and second gating circuits for operating the binary counting stages of the counting circuit and the binary elements of the converting circuit. The first gating circuit produces a first output pulse at the first voltage transition in the series of pulses which is applied to reset terminals of the binary counting stages to set the binary stages to predetermined counting states. The first gating circuit produces a second output pulse at the second voltage transition in the series of pulses which is applied to input terminals of the binary elements of the converting circuit to read the counting states appearing in the selected binary counting stages of the counting circuit.

The second gating circuit is operated by output signals of a second group of binary counting stages of the counting circuit and by a signal from the first gating circuit. The second gating circuit produces a first output signal which is applied to the first gating circuit and determines whether the first gating circuit produces an output signal to operate the binary elements of the converting circuit to read the counting states appearing in the first group of binary counting stages of the counting circuit. In addition, the second gating circuit produces a second output signal which is applied to the indicator circuit for controlling the response of the indicator circuit to the binary output signal produced by the converting circuit.

The accompanying drawings illustrate a preferred embodiment of the invention and, together with the description, serve to explain the principles of the invention.

Figure 1:
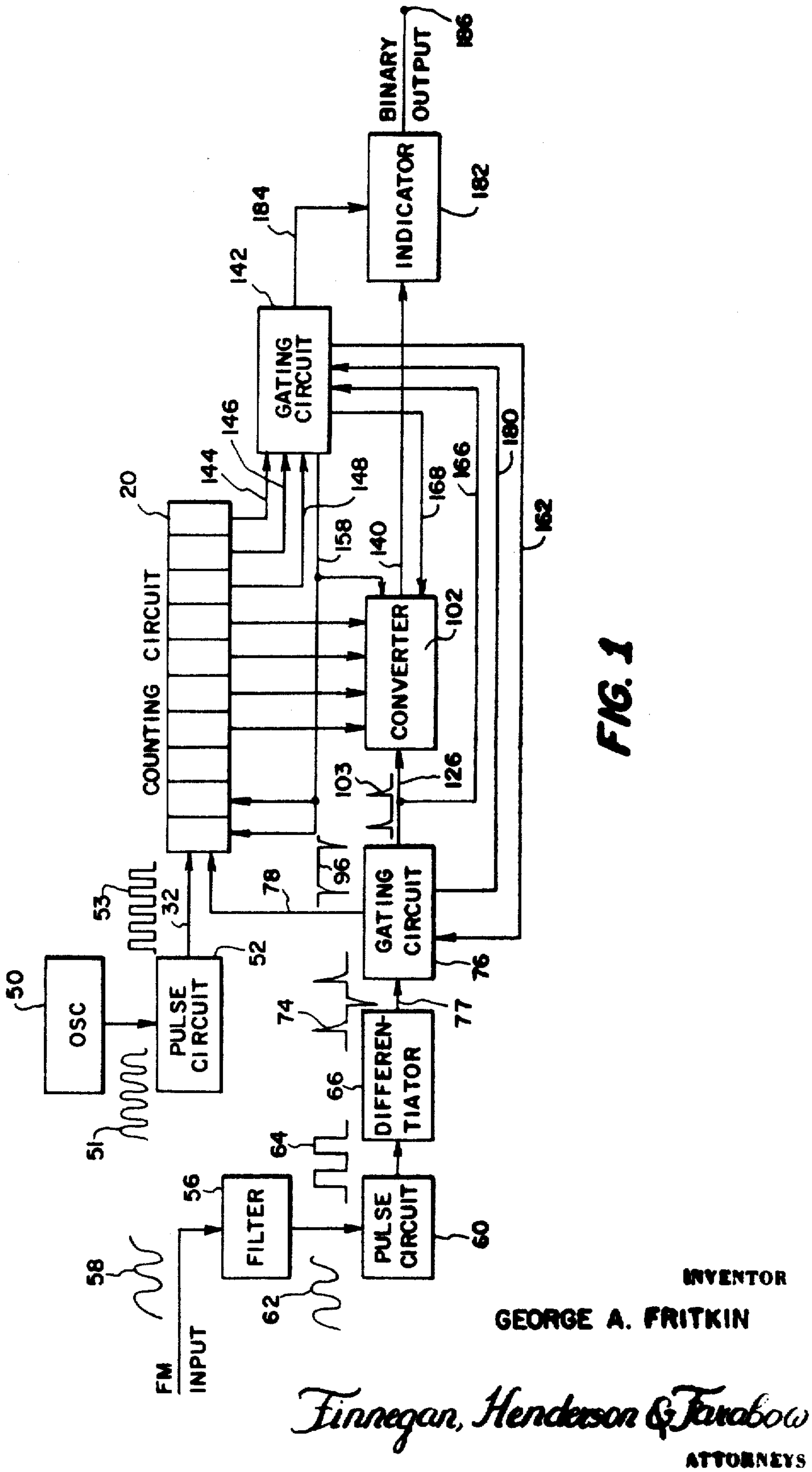
FIG. 1 is a block diagram of a system, including a counting circuit, a converting circuit, gating circuits, and an indicator circuit, constructed in accordance with the principles of the present invention for determining the frequency of an oscillating signal.

In accordance with the invention, a system for determining the frequency of an oscillating signal includes a counting circuit having a plurality of binary counting stages. Referring to FIG. 1, a preferred embodiment of the invention is provided with a counting circuit 20 having a plurality of binary counting stages which are operable in a predetermined counting sequence.

Figure 2:
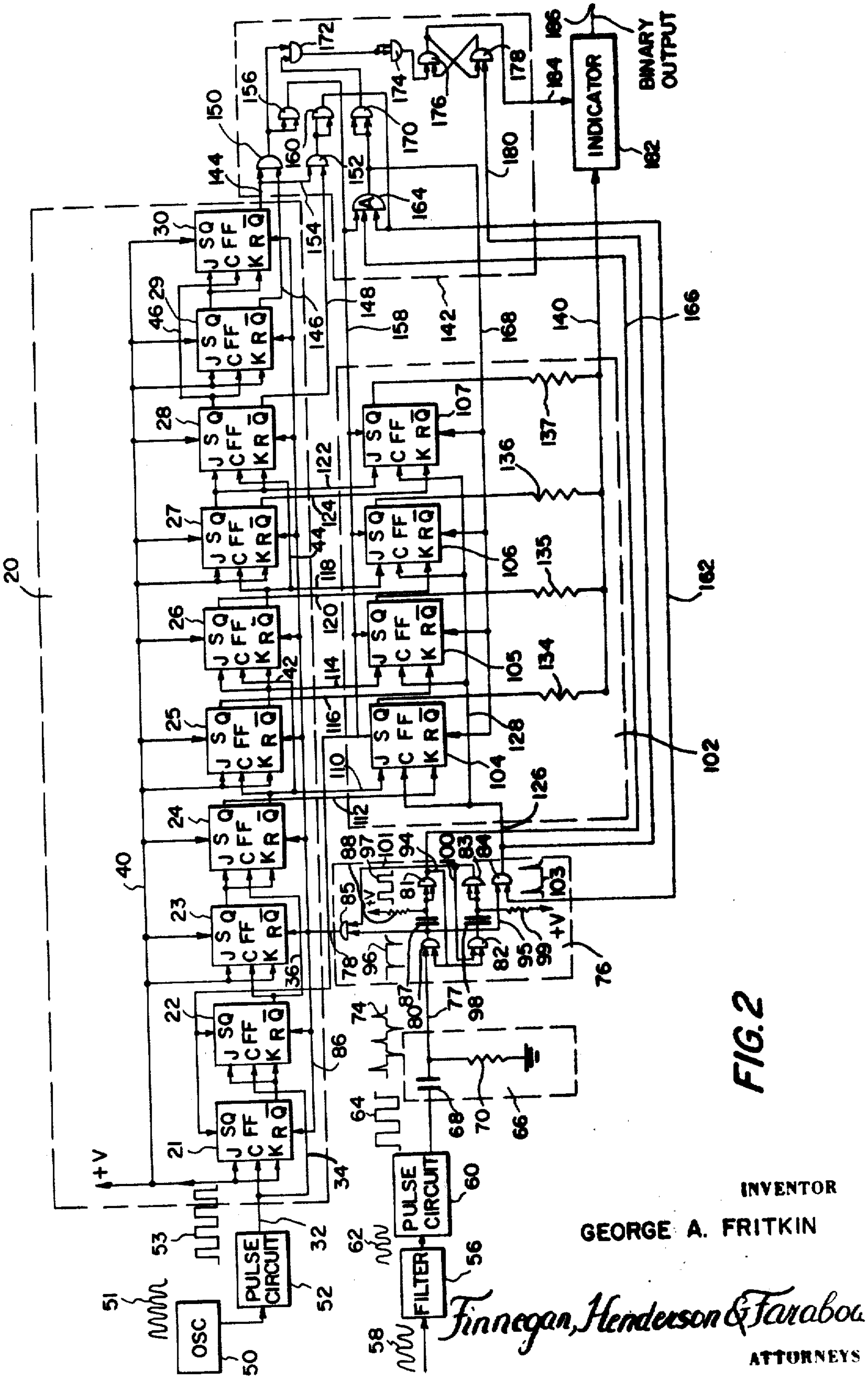
FIG. 2 is a detailed schematic diagram illustrating the counting circuit, converting circuit, and gating circuits of the frequency determining system of FIG. 1.

As shown in FIG. 2, the binary counting stages of counting circuit 20 comprise a series of flip-flops 21–30, inclusive, which are interconnected to operate in the predetermined counting sequence. Each flip-flop has a clock input terminal C, a set terminal S, a reset terminal R, logical input terminals J and K, and logical output terminals Q and $\overline{Q}$.

In the operation of the flip-flop, when a binary "1" is applied to input terminal J and a clock pulse is applied to input terminal C, the flip-flop is driven to its first conducting state and a binary "1" appears at output terminal Q and a binary "0" appears at terminal $\overline{Q}$. If, on the other hand, a binary "1" is applied to input terminal K and a clock pulse is applied to input terminal C, the flip-flop is driven into its second conducting state where a binary "1" appears at output terminal $\overline{Q}$ and a binary "0" appears at output terminal Q.

Further, when a binary "0" is applied to both input terminals J and K, the conducting state of the flip-flop is not changed upon the application of a clock pulse to input terminal C. If a binary "1" is applied to both input terminals J and K, however, the conducting state of the flip-flop is reversed upon the application of a clock pulse to input terminal C.

The set terminal S and reset terminal R of the flip-flop are inverting inputs in that these terminals are actuated by a binary "0" signal. When a binary "0" is applied to set terminal S and a binary "1" to reset terminal R, the flip-flop is set to its first conducting state, i.e., with a binary "1" appearing at output terminal Q and a binary "0" at output terminal $\overline{Q}$. If, on the other hand, a binary "1" is applied to set terminal S and a binary "0" to reset terminal R, the flip-flop is reset to its second conducting state with a binary "0" appearing at output terminal Q and a binary "1" appearing at output terminal $\overline{Q}$.

Flip-flops 21–30 of the counting circuit are interconnected to provide a binary ripple counter which operates in a predetermined counting sequence starting with the flip-flops in their second conducting states, i.e., 0000000000, and terminating with the flip-flops in their first conducting states, i.e., 1111111111. Referring to FIG. 2, input terminals J and K of flip-flop 21 are connected to a common source of potential +V. In addition, output terminal $\overline{Q}$ of flip-flop 21 is connected to input terminals J and K of flip-flop 22.

An input conductor 32 is connected to clock input terminal C of flip-flop 21 and by a conductor 34 to the clock input terminal of flip-flop 22. Similarly, output terminal $\overline{Q}$ of flip-flop 22 is connected to clock input terminal C of flip-flop 23 and by a conductor 36 to the clock input terminal of flip-flop 24.

Input terminals J and K of flip-flops 23, 25, 27, and 29 are connected to a voltage supply conductor 40 which is connected to the common source of potential +V. In addition, set terminals S of flip-flops 23–30, inclusive, are connected to voltage supply conductor 40.

As shown in FIG. 2, output terminal Q OF FLIP-flop 23 is connected to input terminals J and K of flip-flop 24. Output terminal $\overline{Q}$ of flip-flop 24 is connected to clock input terminal C of flip-flop 25 and by a conductor 42 to the clock input terminal of flip-flop 26. Input terminals J and K of flip-flop 26 are connected to output terminal $\overline{Q}$ of flip-flop 25. Output terminal $\overline{Q}$ of flip-flop 26 is connected to clock input terminal C OF flip-flop 27 and by a conductor 44 to the clock input terminal of flip-flop 28.

Input terminals J and K of flip-flop 28 are connected to output terminal Q of flip-flop 27. Output terminal Q of flip-FLOP 28 is connected to clock input terminal C of flip-flop 29 and by a conductor 46 to the clock input terminal of flip-flop 30. Finally, output terminal Q of flip-flop 29 is connected to input terminals J and K of flip-flop 30.

In accordance with the invention, the system for determining the frequency of an oscillating signal includes means for operating the counting circuit at a predetermined frequency to vary the counting states appearing in the binary counting stages. In the preferred embodiment, this means comprises a source connected to the counting circuit for applying pulses at a predetermined frequency to the binary counting stages of the counting circuit. Referring to FIG. 1, the system includes an oscillator 50 for producing a sinusoidal output signal (waveform 51) at a predetermined frequency.

The output of oscillator 50 is applied to a pulse forming circuit 52 which transforms the sinusoidal signal of the oscillator into a squarewave signal (waveform 53) having the same frequency as the sinusoidal signal. The output of pulse forming circuit 52 is applied by conductor 32 to the input of the counting circuit 20, i.e., clock input terminal C of flip-flop 21 (FIG. 2).

In the preferred embodiment, the frequency of the sinusoidal signal produced by the oscillator is 1.3589 MHz. In addition, a frequency $F_1 = 1270$ Hz is used to represent a binary "1," and a frequency $F_2 = 1070$ Hz represents a binary "0."

In accordance with the invention, the system for determining the frequency of an oscillating signal includes a circuit for transforming the oscillating signal into a series of pulses having voltage transitions occurring at a frequency determined by the frequency of the oscillating signal. In the preferred embodiment of the invention, this circuit transforms the received frequency modulated sinusoidal signal into a squarewave signal having the same frequency as the sinusoidal signal. Referring to FIG. 1, the transforming circuit of the preferred embodiment includes a filter 56 to which the frequency modulated sinusoidal signal (waveform 58) is applied. The transforming circuit also includes a pulse forming circuit 60 connected to the output of filter 56.

In the preferred embodiment, filter 56 is a conventional band pass filter which is sharply tuned to the frequency operating range of the system. The band pass filter has a frequency operating range of 970 Hz to 1,370 Hz. The filter eliminates frequency components of the sinusoidal signal not within this frequency operating range and provides a sinusoidal output signal (waveform 62) containing no frequency components which are less than 970 Hz or greater than 1,370 HZ. Pulse forming circuit 60 transforms the sinusoidial output signal of filter 56 into a squarewave signal (waveform 64) having the same frequency as the sinusoidal signal.

The transforming circuit of the preferred embodiment includes a differentiator circuit 66 connected to the output of pulse forming circuit 60. As shown in FIG. 2, the differentiator circuit comprises a capacitance 68 and resistance 70 connected to a common terminal 72. Capacitance 68 is also connected to the output of pulse forming circuit 60, and resistance 70 is also connected to ground. This differentiator circuit transforms the squarewave output signal of pulse forming circuit 60 (waveform 64) into a series of positive and negative spike pulses (waveform 74) which occur at the positive and negative voltage transitions, respectively, of the squarewave signal.

In accordance with the invention, the system includes means operated by a first voltage transition in the series of pulses for setting the binary counting stages of the counting circuit to predetermined counting states. In the preferred embodiment of the system, a gating circuit having an input terminal connected to the transforming circuit and an output terminal connected to reset terminals of the binary counting stages of the counting circuit is provided. The gating circuit produces a reset pulse at its output terminal in response to a first voltage transition in the series of pulses from the transforming circuit.

Referring to FIG. 1, the system includes a gating circuit 76 having an input terminal connected by a conductor 77 to the output of differentiator circuit 66 and a first output terminal connected by a conductor 78 to counting circuit 20. As shown in FIG. 2, the gating circuit includes a set of NOR gates 80–84, inclusive, and an AND gate 85. The AND gate normally produces a binary "1," and it produces a binary "0" when binary "1" signals are applied to its input terminals.

A first input terminal of NOR gate 80 is connected by conductor 77 to the output terminal of differentiator circuit 66. NOR gate 80 has an output terminal which is connected to a first input terminal of AND gate 85. Conductor 78 is connected to the output terminal of AND gate 85 and by a conductor 86 to the reset terminals of flip-flops 21–30, inclusive, of counting circuit 20.

The output terminal of NOR gate 80 is also connected through a capacitance 87 to the input terminals of NOR gate 81. In addition, a resistance 88 connects the input terminals of NOR gate 81 to the common source of potential +V. A conductor 94 connects the output terminal of NOR gate 81 to a second input terminal of NOR gate 80 and to a first input terminal of NOR gate 82. The output terminal of NOR gate 80 is also connected by a conductor 95 to a first input terminal of NOR gate 84.

NOR gates 80 and 81, capacitance 87, and resistance 88 comprise a first one-shot circuit which in response to a positive input pulse applied on conductor 77 to the first input terminal of NOR gate 80 produces a negative pulse at the output terminal of NOR gate 80 and a positive pulse at the output terminal of NOR gate 81 having a duration determined by the values of capacitance 87 and resistance 88. After a predetermined time delay, the signal appearing at the output terminal of NOR gate 81 returns to its normally negative value. When a negative input pulse is applied on conductor 77 to the first input terminal of NOR gate 80, the output signals produced by the one-short circuit are not affected. The negative pulses produced by NOR gate 80 of the gating circuit are illustrated by waveform 96, and the positive output pulses of NOR gate 81 by waveform 97.

Similarly, a capacitance 98 connects the output terminal of NOR gate 82 to the input terminals of NOR gate 83. A resistance 99 connects the input terminals of NOR gate 83 to the common source of potential +V. The output terminal of NOR gate 83 is connected by a conductor 100 to a second input terminal of NOR gate 82 and by a conductor 101 to a second input terminal of AND gate 85.

NOR gates 82 and 83, capacitance 98, and resistance 99 comprise a second one-shot circuit which produces negative and positive pulses at the output terminals of NOR gates 82 and 83, respectively, in response to a positive input pulse applied on conductor 94 to the first input terminal of NOR gate 82. The operation of this second one-shot circuit is identical to the operation of the first one-shot circuit described above.

In accordance with the invention, the system includes a converting circuit including a plurality of binary elements operated by a second voltage transition in the series of pulses and responsive to the counting states appearing in selected binary counting stages of the counting circuit for combining the counting states to produce an output signal to indicate the frequency of the oscillating signal. In the preferred embodiment, the converting circuit comprises a plurality of binary elements connected to selected binary counting stages of the counting circuit for reading the counting states appearing in the selected binary counting stages and for producing output signals determined by the counting states. In addition, the converting circuit of the preferred embodiment includes means for combining the output signals produced by the binary counting elements to produce a binary output signal to indicate the frequency of the oscillating signal. As embodied, this means for combining the output signals of the binary elements comprises a resistance summing network including a plurality of weighted resistances connected to the output terminals of the binary elements.

Referring to FIG. 1, the system includes a converting circuit or converter 102 having a plurality of input terminals which are connected to output terminals of selected binary counting stages of counting circuit 20. As shown in FIG. 2, converting circuit 102 includes a plurality of binary elements or flip-flops 104–107, inclusive. Flip-flops 104–107 are identical to the flip-flops of counting circuit 20, described above.

As shown in FIG. 2, the input terminals of the binary elements are connected to the output terminals of a first group of binary counting stages, i.e., flip-flops 24–27, of the counting circuit. Input terminal J of flip-flop 104 is connected to output terminal $\bar{Q}$ of flip-flop 24 by a conductor 110, and input terminal K of flip-flop 104 is connected to output terminal Q of flip-flop 24 by a conductor 112. Similarly, input terminals J and K of flip-flop 105 are connected by conductors 114 and 116, respectively, to output terminals $\bar{Q}$ and Q of flip-flop 25. Additionally, input terminals J and K of flip-flops 106 and 107 are connected to output terminals $\bar{Q}$ and Q of flip-flops 26 and 27 by conductors 118, 120, 122, and 124.

Referring to FIG. 1, a conductor 126 connects a second output terminal of gating circuit 76 to converting circuit 102. As shown in FIG. 2, conductor 126 is connected to the output terminal of NOR gate 84 of gating circuit 76 and to clock input terminal C of flip-flop 104. A conductor 128 connects the clock input terminals of flip-flops 105, 106, and 107 to conductor 126.

Converting circuit 102 (FIG. 2) includes a resistance summing network having a plurality of weighted resistances 134–137, inclusive, which are connected to output terminals Q of flip-flops 104–107, respectively, and to a common output conductor 140.

In the preferred embodiment, resistances 104–107 are weighted in value to produce sixteen (16) different voltages on output conductor 140 in response to the different combinations of signals appearing at output terminals Q of flip-flops 104–107. The following resistance values can be used in the resistance summing network of the preferred embodiment:

| | |
|---|---|
| Resistance 134 | 40 K |
| Resistance 135 | 20 K |
| Resistance 136 | 10 K |
| Resistance 137 | 5 K |

The preferred embodiment includes a second gating circuit having a plurality of input terminals connected to a second group of binary counting stages of the counting circuit. The second gating circuit has a first output terminal for producing an output signal to indicate that the frequency of the oscillating signal received by the system is within the frequency operating range of the system and a second output terminal for producing an output signal to indicate that the frequency of the received signal is not within the frequency operating range of the system. The second gating circuit also includes a pair of output terminals connected to the set and reset terminals, respectively, of the binary elements of the converting circuit.

Referring to FIG. 1, a second gating circuit 142 of the system includes a plurality of input terminals connected by conductors 144, 146, and 148 to output terminals of a second group of binary counting stages of counting circuit 20. As shown in FIG. 2, conductors 144, 146, and 148 are connected to output terminals $\bar{Q}$ of flip-flops 30, 29, and 28, respectively.

The second gating circuit 142 includes a pair of NOR gates 150 and 152. Output terminals $\overline{Q}$ of flip-flop 30 is connected to a first input terminal of NOR gate 150 by conductor 144 and to a first input terminal of NOR gate 152 by a conductor 154. A second input terminal of NOR gate 150 is connected to output terminal $\overline{Q}$ of flip-flop 29 by conductor 146 and output terminal $\overline{Q}$ of flip-flop 28 is connected by conductor 148 to a second input terminal of NOR gate 152.

The second gating circuit also includes a NOR gate 156 (FIG. 2) having its input terminals connected to the output terminal of NOR gate 150. The output terminal of NOR gate 156 is connected by a conductor 158 to set terminals S of flip-flops 104–107 of converting circuit 102. In addition, set terminals S of flip-flops 21 and 22 of counting circuit 20 are also connected to conductor 158. When the frequency of the received signal is less than the operating range of the system, NOR gate 156 produces an output signal on conductor 158 to set flip-flops 21 and 22 of the counting circuit and flip-flops 104–107 of the converting circuit to their first conducting states.

In the second gating circuit 142, a NOR gate 160 having its input terminals connected to the output terminal of NOR gate 152 is provided. A conductor 162 connects the output terminal of NOR gate 160 to a second input terminal of NOR gate 84 of gating circuit 76. The output terminal of NOR gate 160 constitutes the first output terminal of gating circuit 142 which products an output signal to indicate that the received signal is within the frequency operating range of the system.

Gating circuit 142 (FIG. 2) further includes an AND gate 164 having a first input terminal connected to conductor 158 and a second input terminal connected to conductor 162. In addition, AND gate 164 has a third input terminal connected by conductor 166 to the output terminal of NOR gate 81 of gating circuit 76. The output terminal of AND gate 164 is connected to the input terminals of a NOR gate 170 and by a conductor 168 to reset terminals R of flip-flops 104–107. When the received frequency exceeds the operating range of the system, AND gate 164 produces an output signal to reset flip-flops 104–107 to their second conducting states.

A NOR gate 172 of gating circuit 142 has first and second input terminals connected to the output terminals of NOR gates 150 and 170, respectively. The output terminal of NOR gate 172 is connected to the input terminals of a NOR gate 174 which acts as an inverter for the signal appearing at the output terminal of NOR gate 172.

In the second gating circuit 142, a latch circuit consisting of NOR gates 176 and 178 is provided. A first input terminal of NOR gate 176 is connected to the output terminal of NOR gate 174, and a second input terminal of NOR gate 176 is connected to the output terminal of NOR gate 178. The output terminal of NOR gate 176 constitutes the second output terminal of gating circuit 142 which produces an output signal to indicate that the received frequency is not within the frequency operating range of the system. NOR gate 178 has a first input terminal connected to the output terminal of NOR gate 176 and a second input terminal connected by a conductor 180 to the output terminal of NOR gate 84 of gating circuit 76.

The preferred embodiment of the system includes an indicator circuit connected to the resistance summing network of the converting circuit for producing a binary output signal determined by the counting states appearing in the binary elements of the converting circuit to indicate the binary information represented by the received frequency modulated signal. Referring to FIGS. 1 and 2, an indicator circuit 182 is provided. The indicator circuit has a first input terminal connected to the resistance summing network of converting circuit 102 by conductor 140 and a second input terminal connected by a conductor 184 to the output terminal of NOR gate 176 of gating circuit 142. In addition, indicator 182 has an output terminal 186 for producing a binary output signal to indicate the binary information represented by the received signal.

The signal applied to indicator circuit 182 by conductor 140 indicates the frequency of the frequency modulated signal received by the system. The signal applied by conductor 184 to the indicator circuit indicates whether or not the received frequency is within the frequency operating range of the system. If the received frequency is not within the desired frequency operating range, the signal applied to indicator circuit 182 by conductor 184 prevents the indicator circuit from producing a binary output signal at its output terminal 186.

Figure 3:
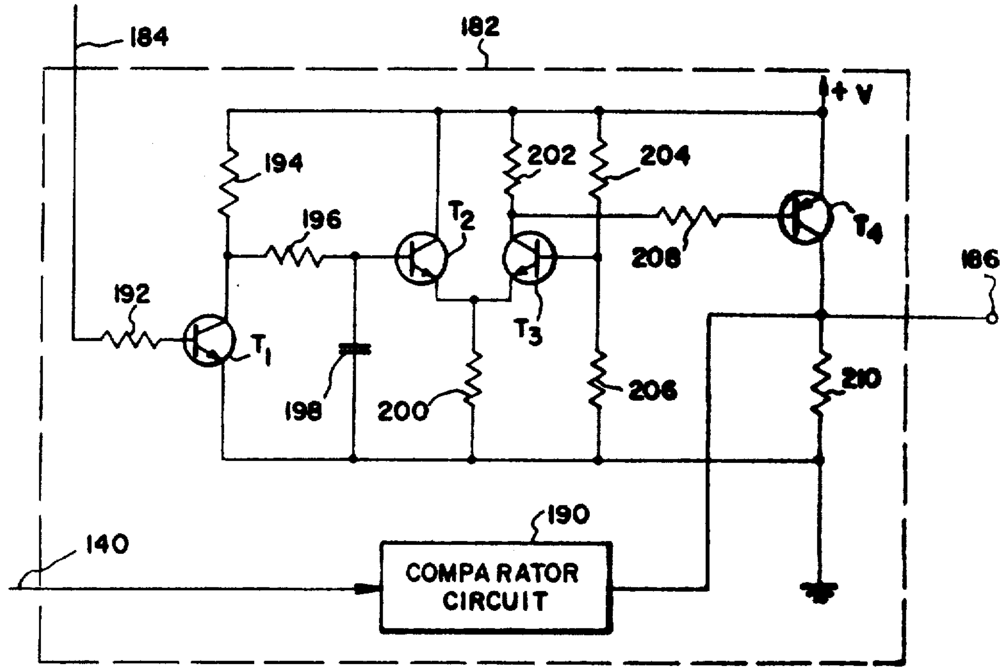
FIG. 3 is a schematic diagram of the indicator circuit of the system of FIGS. 1 and 2.

Referring to FIG. 3, the indicator circuit of the system includes a comparator circuit 190 having an input terminal connected to conductor 140 and an output terminal connected to terminal 186 of the indicator circuit. Comparator circuit 190 compares the voltage applied to conductor 140 by the resistance summing network of converting circuit 102 (FIG. 2) with an internal reference potential and produces a positive output signal at its output terminal if that voltage exceeds the internal reference potential. The comparator circuit produces a low or ground potential at its output terminal if the voltage applied to conductor 140 is less than the internal reference voltage.

Figure 4:
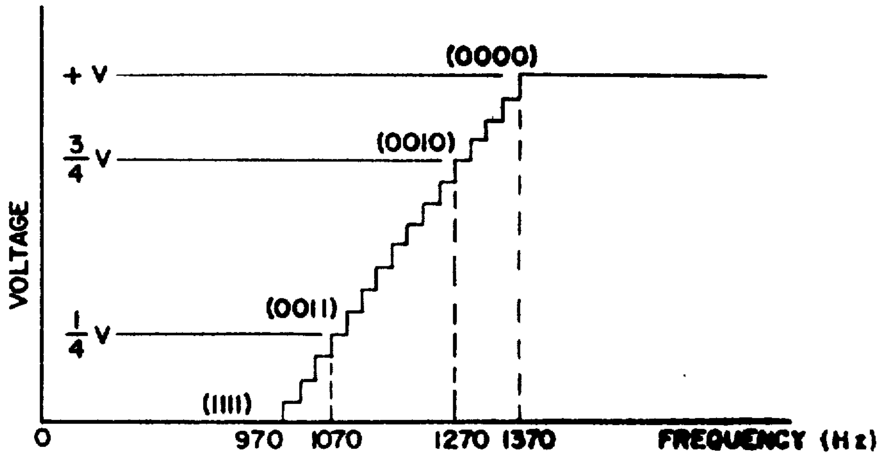
FIG. 4 is a graph illustrating the output signal produced by the converting circuit of FIGS. 1 and 2 as a function of the frequency of the oscillating signal.

As shown in FIG. 4, indicator circuit 182 also includes circuitry for determining whether the output signal produced by comparator circuit 190 affects the voltage which appears at output terminal 186 of the indicator circuit. This circuitry includes a plurality of transistors $T_1$, $T_2$, $T_3$, and $T_4$. The base electrode of transistor $T_1$ is connected to conductor 184 through a resistance 192. The emitter electrode of transistor $T_1$ is grounded, and its collector electrode is connected to the common source of potential +V through a resistance 194.

The collector electrode of transistor $T_1$ is also connected to the base electrode of transistor $T_2$ by a resistance 196. A capacitance 198 connects the base electrode of transistor $T_2$ to ground. The collector electrode of transistor $T_2$ is connected directly to the common source of potential +V and its emitter electrode is connected to ground through a resistance 200.

The emitter electrode of transistor $T_3$ is also connected to resistance 200. The collector electrode of transistor $T_3$ is connected to the common source of potential +V through a resistance 202. A pair of resistances 204 and 206 is connected in series between the common source of potential +V and ground, and the base electrode of transistor $T_3$ is connected to the common terminal of resistances 204 and 206. In addition, a resistance 208 connects the collector electrode of transistor $T_3$ to the base electrode of transistor $T_4$. The emitter electrode of transistor $T_4$ is connected directly to the common source of potential +V, and its collector electrode is connected by a resistance 210 to ground.

When a positive voltage is applied to the base electrode of transistor $T_1$ by conductor 184, transistor $T_1$ is rendered conducting and a low voltage appears at its collector electrode and is applied to the base electrode of transistor $T_2$ to cut off transistor $T_2$. When transistor $T_2$ is rendered non-conducting, the potential across resistance 200 decreases and transistor $T_3$ is thereby rendered conductive. With transistor $T_3$ conducting, a low voltage appears at the collector electrode of transistor $T_3$ and is applied to the base electrode of transistor $T_4$ through resistance 208. Thus, transistor $T_4$ is biased into conduction and the voltage across resistance 210 is equal to the voltage +V of the common source of potential. With transistor $T_4$ conducting, voltage changes appearing at the output terminal of comparator circuit 190 have no effect on the voltage applied to output terminal 186 of the indicator circuit.

When a negative potential is applied to the base electrode of transistor $T_1$ by conductor 184, transistor $T_1$ is cut off and transistor $T_2$ is thereby rendered conductive. With transistor $T_2$ conducting, the potential across resistance 200 increases to the voltage +V of the common source of potential and transistor $T_3$ is thereby cut off. When transistor $T_3$ is nonconducting, the voltage applied to the base electrode of transistor $T_4$ is increased to cut off transistor $T_4$. Thus, with transistor $T_4$ in its non-conducting state, the voltage appearing at output terminal 186 of the indicator circuit is determined by the output signal produced by comparator circuit 190.

OPERATION

In the transmission of binary information an FM signal having a frequency of 1,270 Hz is used to represent a binary "1" and an FM signal having a frequency of 1,070 Hz represents a binary "0." The system responds to FM signals in the frequency range of 970 to 1,370 Hz and produces a binary "1" output signal if the received frequency is 1,270 Hz and a binary "0" output signal if the received frequency is 1,070 Hz.

In the operation of the system, counting circuit 20 is continuously operated in its predetermined counting sequence by squarewave pulses (waveform 53) derived from oscillator 50 and pulse forming circuit 52. The frequency of the squarewave pulses is 1.3589 Mhz.

The received FM signal (waveform 58) is applied to filter 56 which is sharply tuned to the frequency operating range of 970 to 1,370 Hz. Filter 56 eliminates frequency components from the received FM signal which are not within the desired frequency range and produces a sinusoidal output signal (waveform 62) having a frequency determined by the frequency of the FM signal.

The sinusoidal output signal (waveform 62) produced by filter 56 is applied to pulse forming circuit 60 which transforms the sinusoidal signal into a squarewave signal (waveform 64) having the same frequency as the sinusoidal signal. The squarewave output signal of pulse forming circuit 60 is applied to differentiator circuit 66 to produce a series of positive and negative spike pulses (waveform 74) at its output terminal 72 coincident with the positive and negative voltage transitions of the squarewave signal. In the preferred embodiment of the system, the positive voltage transitions of the squarewave signal constitute the "first" voltage transitions, and the negative transitions constitute the "second" voltage transitions, mentioned above in the description of the system. The positive and negative spike pulses produced by differentiator circuit 66 are applied by conductor 77 to the first input terminal of NOR gate 80 of gating circuit 76.

In the operation of gating circuit 76, NOR gate 80 normally produces a binary "1" or high voltage which is applied to the first input terminal of AND gate 85. As explained above, a binary "1" signal normally appears at the output terminal of AND gate 85. NOR gate 81 normally produces a binary "0" or low voltage which is applied by conductor 94 to the second input terminal of NOR gate 80 and to the first input terminal of NOR gate 82. In addition, NOR gate 82 normally produces a binary "1" output signal and NOR gate 83 normally produces a binary "0" output signal which is applied by conductor 100 to the second input terminal of NOR gate 82.

When a positive spike pulse appears on conductor 77, NOR gate 80 produces a binary "0" output signal which is applied to AND gate 85 and NOR gate 81. This binary "0" output signal has no effect on the output signal of AND gate 85, but it causes NOR gate 81 to produce a binary "1" output pulse, as illustrated by waveform 97. The duration of the binary "1" output pulse produced by NOR gate 81 is determined by the resistance and capacitance values of the R-C circuit consisting of resistance 88 and capacitance 87.

The binary "1" output pulse (waveform 97) produced by NOR gate 81 is applied to NOR gate 82 and, in response to this pulse, a binary "0" signal appears at the output terminal of NOR gate 82 and a binary "1" output pulse appears at the output of NOR gate 83. This binary "1" output pulse is applied by conductor 101 to the second input terminal of AND gate 85. The duration of the binary "1" output pulse produced by NOR gate 83 is determined by the R-C circuit consisting of resistance 99 and capacitance 98.

During the binary "1" output pulse produced by NOR gate 83, the output of NOR gate 80 returns to its normal binary "1" output signal. This binary "1" signal is applied to the first input terminal of AND gate 85 to produce a binary "0" signal at its output terminal which is applied by conductors 78 and 86 to the reset terminals of flip-flops 21–30 of counting circuit 20. Thus, flip-flops 21–30 are reset to their second conducting states and produce binary "1" output signals at their output terminals $\overline{Q}$.

The binary "1" output signal normally produced by NOR gate 80 is also applied by conductor 95 to the first input terminal of NOR gate 84 of gating circuit 76. Normally, a binary "0" signal is applied to the second input terminal of NOR gate 84 on conductor 162 so that the binary "1" signal from NOR gate 80 does not affect NOR gate 84 and the binary "0" output signal of NOR gate 84 is not changed. When a binary "0" signal indicating that the frequency of the received FM signal is within the frequency operating range of the system is applied to NOR gate 84 on conductor 162, NOR gate 84 produces a binary "1" output signal (waveform 103) which is applied by conductor 126 to the clock input terminals of flip-flops 104–107. The binary "1" signal applied to the clock input terminals enables flip-flops 104–107 to respond to the binary signals from flip-flops 24–27 of the counting circuit which are applied to input terminals J and K of flip-flops 104–107 to read the counting states appearing in flip-flop 24–27.

Flip-flops 104–107 of the converting circuit are thus driven to conducting states determined by the binary output signals produced by flip-flops 24–27 of the counting circuit. The resistance summing network, i.e., resistances 134–137 combines the binary output signals appearing at output terminals Q of flip-flops 104–107 to produce a voltage on conductor 140 determined by the counting states appearing in flip-flops 24–27 to indicate the frequency of the received FM signal.

In operation of gating circuit 142, when a binary "0" signal is applied by conductors 78 and 86 to the reset terminals of flip-flops 21–30 of the counting circuit, the binary "1" signals appearing at output terminals $\overline{Q}$ of flip-flops 28, 29, and 30 are applied to the input terminals of NOR gates 150 and 152. Thus, with flip-flops 21–30 of counting circuit 20 reset to their second conducting states at the start of a squarewave pulse produced by pulse forming circuit 60, NOR gates 150 and 152 produce binary "0" output signals.

The binary "0" output signal produced by NOR gate 150 is inverted by NOR gate 156 to apply a binary "1" signal on conductor 158 to the first input terminal of AND gate 164 and to the set terminals of flip-flops 21 and 22 of the counting circuit and flip-flops 104–107 of the converting circuit. The binary "0" signal produced by NOR gate 152 is inverted by NOR gate 160 to apply a binary "1" signal on conductor 162 to the second input terminal of AND gate 164 and to the second input terminal of NOR gate 84. Thus, at the start of the squarewave pulse (waveform 64), the binary "1" signal on conductor 162 prevents NOR gate 84 of gating circuit 76 from producing a binary "1" output signal.

AND gate 164 normally produces a binary "1" output signal which is inverted by NOR gate 170 to apply a binary "0" signal to the second input terminal of NOR gate 172. With binary "0" signals applied to both of its input terminals, NOR gate 172 produces a binary "1" output signal which is inverted by NOR GATE 174 to apply a binary "0" signal to the first input terminal of NOR gate 176. Since, as mentioned above, a binary "0" signal is normally applied on conductor 180 to the first input terminal of NOR gate 178, the latching circuit normally produces a binary "1" signal at the output terminal of NOR gate 176. This binary "1" output signal is applied by conductor 184 to indicator circuit 182 to prevent the indicator circuit from responding to the output voltage of the converting circuit on conductor 140.

The system of the present invention determines whether the received FM signal is within the frequency operating range of the system. If the received frequency is not within the desired frequency range, the indicator circuit of the system is not allowed to respond to the received signal. If the received frequency is within the desired range, the system operates to measure the frequency and to produce an output signal indicating the binary information represented by the FM signal.

When the frequency of the received FM signal exceeds the frequency operating range of the system, the duration of the squarewave pulses (waveform 64) produced by pulse forming circuit 60 is too small to permit counting circuit 20 to be operated to a counting state at which converting circuit 102 is allowed to read the counting states appearing in flip-flops 24–27. At the start of the squarewave pulse to be measured, a first positive spike pulse applied to NOR gate 80 resets flip-flops 28, 29, and 30 of the counting circuit to produce binary "1" signals at their output terminals $\bar{Q}$. Thus, NOR gate 150 produces a binary "0" output signal which is directly applied to NOR gate 172, and NOR gate 156 inverts the binary "0" output signal of NOR gate 150 to a binary "1" signal which is applied to AND gate 164. Similarly, NOR gate 152 produces a binary "0" signal which is inverted by NOR gate 160 to a binary "1" signal and applied to AND gate 164.

When a second positive spike pulse is applied to NOR gate 80 at the end of the squarewave pulse, a binary "1" signal is produced at the output of NOR gate 82 and applied to AND gate 164 which produces a binary "0" signal to indicate that the received frequency is less than the frequency operating range of the system. The binary "0" output signal of AND gate 164 is applied by conductor 168 to the reset terminals of flip-flops 104–107 to reset the flip-flops to their second conducting states.

Simultaneously, NOR gate 170 produces a binary "1" signal which is applied to NOR gate 172. With this binary "1" signal applied to its input terminal, NOR gate 172 produces a binary "0" output signal which is inverted by NOR gate 174 to apply a binary "1" signal to NOR gate 176 of the latching circuit. Since NOR gate 84 applies a binary "0" SIGNAL TO NOR gate 178 of the latching circuit on conductor 180, the latching circuit produces a binary "1" output signal on conductor 184 which is applied to indicator circuit 182. The indicator circuit is thus prevented from producing an output signal at terminal 186 in response to the output voltage of the resistance summing network of converting circuit 102.

When the frequency of the received FM signal is within the desired frequency operating range of the system, counting circuit 20 is operated in its predetermined counting sequence until flip-flops 21–30 of the counting circuit reach the counting states 0000000101. With the flip-flops in these counting states, a binary "1" signal appears at output terminal $\bar{Q}$ of flip-flop 29 and binary "0" signals appear at terminals $\bar{Q}$ of flip-flops 28 and 30. NOR gate 150 thus produces a binary "0" output signal which is applied to NOR gate 172. Since, at this time, NOR gate 81 continues to produce a binary "0" output signal on conductor 166, AND gate 164 produces a binary "1" signal which is inverted by NOR gate 170 and applied to NOR gate 172 as a binary "0." With binary "0" signals on both input terminals, NOR gate 172 produces a binary "1" output signal which is inverted by NOR gate 174 and applied as a binary "0" to NOR gate 176 of the latching circuit.

NOR gate 84 of gating circuit 76 initially applies a binary "0" signal to NOR gate 178 of the latching circuit. Thus, with binary "0" signals applied to both NOR gates 176 and 178, binary "1" output signals appear at both output terminals of the latching circuit, i.e., the output terminals of NOR gates 176 and 178, and indicator circuit 182 is inhibited from responding to the output voltage on conductor 140. When flip-flops 21–30 of the counting circuit arrive at the counting states 0000000101, NOR gate 152 produces a binary "1" output signal which is inverted by NOR gate 160 to a binary "0" signal which is applied on conductor 162 to the second input terminal of NOR gate 84. The binary "0" signal applied to NOR gate 84 on conductor 162 enables NOR gate 84 to respond to a binary "0" pulse from NOR gate 80.

Counting circuit 20 continues to operate in its predetermined counting sequence, and flip-flops 24–27 of the counting circuit are driven through the following sequence of counting states:

| | Flip-Flop No. 24 | 25 | 26 | 27 |
|---|---|---|---|---|
| Start | 0 | 0 | 0 | 0 |
| 1 | 1 | 0 | 0 | 0 |
| 2 | 0 | | 0 | 0 |
| 3 | 1 | 1 | 0 | 0 |
| 4 | 0 | 0 | 1 | 0 |
| 5 | 1 | 0 | 1 | 0 |
| 6 | 0 | 1 | 1 | 0 |
| 7 | 1 | 1 | 1 | 0 |
| 8 | 0 | 0 | 0 | 1 |
| 9 | 1 | 0 | 0 | 1 |
| 10 | 0 | 1 | 0 | 1 |
| 11 | 1 | 1 | 0 | 1 |
| 12 | 0 | 0 | 1 | 1 |
| 13 | 1 | 0 | 1 | 1 |
| 14 | 0 | 1 | 1 | 1 |
| 15 | 1 | 1 | 1 | 1 |
| 16 | 0 | 0 | 0 | 0 |

Flip-flops 24–27 of the counting circuit thus provide sixteen (16) different counting states in the frequency operating range of the system. FIG. 4 illustrates the output voltages of the resistance summing network of converting circuit 102 which would be obtained if the above counting states appearing in flip-flops 24–27 were read in sequence by flip-flops 104–107 of the converting circuit. As shown in FIG. 4, the counting circuit divides the frequency range of 970 to 1,370 Hz into sixteen (16) equal divisions. Thus, sixteen (16) different output voltages can be obtained from the resistance summing network to indicate frequencies in the desired frequency range.

When a second positive spike pulse indicating the end of a squarewave pulse to be measured is applied to NOR gate 80, a binary "0" pulse appears at the output terminal of NOR gate 80 and NOR gate 84 produces a binary "1" output signal to operate flip-flops 104–107 of the converting circuit. The binary "1" output signal produced by NOR gate 84 is applied to the clock input terminals of flip-flops 104–107, and flip-flops 104–107 read the counting states appearing in flip-flops 24–27 of counting circuit 20. The signals produced at output terminals Q of flip-flops 104–107 are determined by the counting states appearing in the flip-flops 24–27 and are combined by resistances 134–137 of the resistance summing network. Thus, the output voltage produced by the resistance summing network on conductor 140 is determined by the frequency of the received FM signal.

If, for example, the frequency of the received FM signal is 1,270 Hz, the counting states appearing in flip-flops 24–27 of the counting circuit at the end of the squarewave pulse is 0010. Referring to FIG. 4, the voltage produced on conductor 140 by the resistance summing network in response to the counting states read by flip-flops 104–107 is three-fourths V. If, on the other hand, the frequency of the received FM signal is 1,070 Hz, the counting state 0011 appears in flip-flops 24–27 at the end of the squarewave pulse. The voltage produced by the resistance summing network on conductor 140 when the counting states 0011 are read by flip-flops 104–107 is one-fourth V.

Referring to FIG. 3, comparator circuit 190 produces a positive output potential which is applied to output terminal 186 of the indicator circuit when the voltage applied to its input terminal on conductor 140 is three-fourths V. The comparator circuit produces a ground potential which is applied to output terminal 186 when the voltage applied to its input terminal is one-fourth V. Since, as described above, a binary "0" signal is applied to indicator circuit 182 on conductor 184 to permit the indicator circuit to respond to the signals on conductor 140, a binary "1" signal (three-fourths V) or binary "0" signal (one-fourth V) appears at output terminal 186 of the indicator circuit to indicate the binary information received by the system.

If the frequency of the received FM signal is less than the frequency operating range of the system, the duration of the squarewave pulse (waveform 64) produced by pulse forming circuit 60 is too large to be measured by the system. In this case, counting circuit 20 is operated in its predetermined counting sequence until binary "0" signals appear at output terminals Q of flip-flops 29 and 30. At this time, NOR gate 150 produces a binary "1" output signal which is applied to NOR gates 156 and 172. NOR gate 156 inverts the binary "1" signal and produces a binary "0" signal at its output terminal which is applied on conductor 158 to the reset terminals of flip-flops 21 and 22 of the counting circuit and flip-flops 104–107 of the converting circuit Flip-flops 104–107 are thus set to their first conducting states and binary "1" signals appear at their output terminals Q. Simultaneously, the binary "0" signal produced by NOR gate 156 resets flip-flops 21 and 22 of counting circuit 20 to their first conducting states and the operation of the counting circuit is terminated.

With a binary "1" signal applied to its input terminal by NOR gate 150, NOR gate 172 produces a binary "0" signal which is inverted by NOR gate 174 and a binary "1" signal is applied to NOR gate 176 of the latching circuit. Since a binary "0" signal is applied to NOR gate 178 of the latching circuit by NOR gate 84, NOR gate 176 produces a binary "1" output signal on conductor 184 to inhibit indicator circuit 182 from responding to the output voltages converting circuit 102.

The system of the present invention provides an extremely accurate system for determining the frequency of an oscillating signal. It is particularly useful in the demodulating circuitry of an FM system for transmitting binary information. The system is capable of determing whether the frequency of the received FM signal is within the frequency operating range used to represent binary information and producing a binary output signal to indicate the received information if the received frequency is within the frequency operating range.

The invention in its broader aspects is not limited to the specific details shown and described, and modifications may be made in the details of the frequency modulating system for receiving binary information without departing from the principles of the present invention.

What is claimed is:

1. A system for determining the frequency of an oscillating signal, which comprises:

a counting circuit including a plurality of binary counting stages;

means for operating said counting circuit at a predetermined frequency to vary the counting states appearing in the binary counting stages;

a circuit for transforming the oscillating signal into a series of pulses having voltage transitions occurring at a frequency determined by the frequency of the oscillating signal;

means operated by a first voltage transition in the series of pulses for setting the binary counting stages of said counting circuit to predetermined counting states; and a converting circuit including a plurality of binary elements operated by a second voltage transition in the series of pulses and responsive to the counting states appearing in selected binary counting stages of said counting circuit for combining the counting states to produce an output signal to indicate the frequency of the oscillating signal.

2. The system of claim 1, wherein the means for operating the counting circuit at a predetermined frequency comprises:

a source connected to said counting circuit for applying pulses at a predetermined frequency to the binary counting stages of said counting circuit.

3. The circuit of claim 1, wherein the transforming circuit comprises:

a pulse forming circuit for transforming the oscillating signal into a squarewave signal having the same frequency as the oscillating signal.

4. The system of claim 1, wherein the means for setting the binary elements of the counting circuit to predetermined counting states comprises:

a gating circuit having an input terminal connected to said transforming circuit and an output terminal connected to reset terminals of the binary counting stages of said counting circuit for producing a reset pulse at its output terminal in response to a first voltage transition applied to its input terminal.

5. The system of claim 1, wherein said converting circuit comprises:

1. a plurality of binary elements connected to selected binary counting stages of said counting circuit for reading the counting states appearing in the selected binary counting stages and producing output signals determined by the counting states; and
2. means for combining the output signals produced by said binary elements to produce a binary output signal to indicate the frequency of the oscillating signal.

6. The system of claim 5, wherein the means for combining the output signals produced by the binary elements of the converting circuit includes:

a resistance summing network having a plurality of weighted resistances connected to output terminals of said binary elements and to a common output for producing a signal at said common output in response to signals appearing at the output terminals of said binary elements to indicate the frequency of the oscillating signal.

7. A system for demodulating a frequency modulated sinusoidal signal, which comprises:

a counting circuit including a plurality of binary counting stages operable in a predetermined counting sequence;

a source for applying a series of input pulses to said counting circuit at a predetermined frequency to vary the counting states appearing in said binary counting stages in the predetermined counting sequence;

a circuit for transforming the frequency modulated sinusoidal signal into a squarewave signal having the same frequency as the sinusoidal signal;

a converting circuit having a plurality of binary elements connected to a first group of binary counting stages of said counting circuit for reading the counting states appearing in the first group of binary counting stages and producing an output signal determined by the counting states; and a first gating circuit having an input terminal connected to the output of the transforming circuit and a first output terminal connected to reset terminals of said binary counting stages for applying a reset pulse to said binary counting stages at a first voltage transition of the squarewave signal;

said first gating circuit having a second output terminal connected to input terminals of said binary elements of said converting circuit for applying an operating pulse to said binary elements at a second voltage transition in the squarewave signal to operate said converting circuit to read the counting states in the first group of binary counting stages and produce an output signal indicative of the frequency of the sinusoidal signal.

8. The system of claim 7, wherein the converting circuit includes:

a resistance summing network having a plurality of weighted resistances connected to output terminals of said binary elements and to a common output terminal for producing a signal at said common output terminal in response to signals appearing at the output terminals of said binary elements to indicate the frequency of the sinusoidal signal.

9. The system of claim 7, which includes:

a second gating circuit having a plurality of input terminals connected to output terminals of a second group of binary counting stages of said counting circuit and having a first output terminal connected to set terminals of said binary elements of said converting circuit for producing an output pulse in response to a first set of input signals from said second group of binary counting stages and a second output terminal connected to reset terminals of said binary elements for producing an output pulse in response to a second set of input signals from said second group of binary counting stages.

10. The system of claim 9, wherein:

said first output terminal of said second gating circuit is also connected to set terminals of a third group of binary counting stages of said counting circuit.

11. A system for determining the frequency of a frequency modulated signal used to represent binary information and producing a binary output signal to indicate the binary information represented by the frequency modulated signal, which comprises:

a counting circuit including a plurality of binary counting stages operable in a predetermined counting sequence;

a source for applying input pulses to said counting circuit at a predetermined frequency to vary the counting states appearing in said binary stages in the predetermined counting sequence;

a converting circuit having a plurality of binary elements connected to corresponding binary counting stages of said counting circuit for receiving binary signals from the corresponding binary counting stages, said converting circuit including a resistance summing network connected to output terminals of said binary elements for combining the output signals of the binary elements into a single analog signal;

a circuit for transforming the frequency modulated signal into a squarewave signal having a frequency determined by the frequency modulated signal;

a first gating circuit having an input terminal connected to the output of the transforming circuit and having a first output terminal connected to reset terminals of said binary counting stages of said counting circuit for producing a first output pulse coincident with a first voltage transition at the start of a squarewave pulse produced by the transforming circuit to reset said binary counting stages;

said first gating circuit having a second output terminal connected to input terminals of said binary elements of said converting circuit for producing a second output pulse coincident with a second voltage transition at the end of the squarewave pulse to operate the binary elements of said converting circuit to receive binary signals from the binary counting stages of said counting circuit; and an indicator circuit connected to the resistance summing network of said converting circuit for producing a binary output signal determined by the counting states of the binary elements of said converting circuit to indicate the binary information represented by the frequency modulated signal.

12. The system of claim 11, which includes:

a second gating circuit having input terminals connected to a second group of binary counting stages of said counting circuit and a first output terminal for producing an output signal in response to a first set of input signals from the selected binary counting stages to indicate that the frequency modulated signal is within the frequency operating range of the system;

said second gating circuit having a second output terminal for producing an output signal in response to a second set of input signals from the selected binary counting stages to indicate that the frequency of the frequency modulated signal is not within the frequency operating range of the system and does not represent binary information.

13. The system of claim 12, wherein:

said first output terminal of said second gating circuit is connected to said first gating circuit for applying a first signal to said first gating circuit to prevent said first gating circuit from producing an output pulse to operate said binary elements of said converting circuit when the frequency of the frequency modulated signal is not within the frequency operating range of the system and for applying a second signal to said first gating circuit to permit said first gating circuit to generate an output pulse to operate said binary elements when the frequency is within the operating range of the system.

14. The system of claim 12, wherein:

said second output terminal of said second gating circuit is connected to said indicator circuit to prevent said indicator circuit from producing a binary output signal when an output signal appears at said second output terminal.

* * * * *